United States Patent [19]

Wollar

[11] Patent Number: 4,865,281
[45] Date of Patent: Sep. 12, 1989

[54] ONE-PIECE NON-ROTATABLE WIRE RETAINER CLIP WITH PINE-TREE FASTENER

[75] Inventor: Burnell J. Wollar, Barrington, Ill.

[73] Assignee: Phillips Plastics Corporation, Phillips, Wis.

[21] Appl. No.: 276,575

[22] Filed: Nov. 28, 1988

[51] Int. Cl.$^4$ .............................................. F16B 15/00
[52] U.S. Cl. ....................................... 248/71; 24/458; 248/73; 248/74.2
[58] Field of Search .......................... 248/73, 74.2, 71; 24/297, 458

[56] References Cited

U.S. PATENT DOCUMENTS

| | | | |
|---|---|---|---|
| 1,896,865 | 2/1933 | Hall | 248/73 |
| 1,995,370 | 3/1935 | Walters | 248/73 X |
| 2,666,968 | 1/1954 | Bedford, Jr. | 248/73 |
| 2,746,112 | 5/1956 | Simon | 248/74.2 X |
| 3,015,869 | 1/1962 | Rapata | 248/73 |
| 4,466,589 | 8/1984 | Leonardo | 248/73 X |
| 4,710,852 | 1/1987 | Keen | 24/458 X |

FOREIGN PATENT DOCUMENTS 1401899  4/1965  France ................................ 248/74.2

Primary Examiner—Alvin C. Chin-Shue
Assistant Examiner—David L. Talbott
Attorney, Agent, or Firm—James E. Nilles; Thomas F. Kirby

[57] ABSTRACT

A one-piece, molded plastic wire retainer clip is provided for supporting flexible, axially shiftable insulated electric wires on an automobile steering column. The clip comprises a flat base, a pine-tree fastener extending from the bottom of the base for insertion in a mounting hole in the steering column wherein it is frictionally secured, a projection extending upwardly from the base and engageable with an abutment on the steering column to prevent rotation of the clip, and a wire retainer portion supported on the projection. The wire retainer portion comprises opposing side walls, one joined at its lower end to the projection and both joined at the top by an end wall, and the other having a free lower end. The walls cooperate to define a channel open at both ends and having an opening along its bottom side which confronts the base. The free end of the other side wall is resiliently flexible and is movable outwardly away from the one side wall to enable a wire to be inserted laterally through the opening and into the channel, whereafter it biases toward the one side wall to narrow the opening and prevent the wire from falling out of the channel. The resiliently flexible side enables the wire to be intentionally moved laterally out of the channel through the opening.

5 Claims, 2 Drawing Sheets

ONE-PIECE NON-ROTATABLE WIRE RETAINER CLIP WITH PINE-TREE FASTENER

BACKGROUND OF THE INVENTION

1. Field of Use

This invention relates generally to a one-piece, molded plastic retainer clip having a pine-tree fastener for securing elongated members, such as electric wires or tubes, to a structure, such as the steering column of an automobile, and having a channel for securing the elongated members thereon.

2. Description of the Prior Art

Many types of equipment employ retainer clips of various types to secure elongated members, such as electric wires or tubes, to a structure or component forming part of the equipment. Prior art retainer clips take various forms and are designed to suit particular needs. One type of prior art clip, for example, is affixed to a structure by a simple screw which threads into a threaded mounting hole in the structure and tightly grips the elongated member which is to be held in place. However, provision of a threaded mounting hole adds to production costs and prevention of axial movement of the elongated members may be disadvantageous or undesired in some types of equipment. Other types of prior art clips comprise several separate parts which must be selected and manually assembled prior to or during installation and this also adds to production costs, especially in cases where many such clips must be installed. Multi-part clips are also more costly to fabricate, since separate dies and molding machines for each of the parts are required. Some prior art clips presently in use for particular and specialized types of equipment are not really well-suited therefor, especially in the automotive field.

For example, automobiles typically employ prior art wire retainer clips mounted on the steering column to support electric wires which run from the engine compartment to electric control switches mounted on a movable (rotatable and/or tiltable) portion of the steering column, such as directional signal switches, air-bag switches and the like. The wires and clips are concealed and protected by a metal or plastic shroud which is removably attached to the steering column.

Multi-piece type prior art clips and those secured by screws are difficult to install, especially in cases where the clips must be attached to the underside of the steering column. Furthermore, some clips tightly grip the wires and, since portions of the wires must move in response to turning or tilting motions of the steering column, the wires are eventually chaffed, damaged or broken. Removal of the shroud and clips to enable servicing of damaged wires or associated faulty switches is time-consuming and costly.

It is desirable, therefore, to provide improved retainer clips for securing and supporting elongated members, such as wires, on a structure, such as the steering column of an automobile, and which have other applications, in order to expedite production, facilitate servicing, and reduce the labor and costs involved in both.

SUMMARY OF THE INVENTION

The present invention provides a retainer clip which is detachably mountable on a structure, such as the steering column of an automobile, to releasably and slidably secure and support elongated members, such as electric wires, on the steering column.

The clip presupposes a structure having a surface with a mounting hole therein and an abutment extending from the surface and spaced from the mounting hole.

The clip comprises a base member having opposite base surfaces; fastener means extending from one of the base surfaces for axial insertion into the mounting hole to mount the clip on the structure; means on the base member engageable with the abutment when the fastener means is inserted into the mounting hole to support the clip and to prevent rotation of the clip relative to the axis of the fastener means; and wire-retainer means supported on the base member and defining a channel for receiving and slidably supporting the elongated members. The channel is open at both ends and has a side opening through which the elongated members are insertable laterally into the channel. The side opening confronts but is spaced from the base member. The retainer means comprises walls defining the channel and at least one side wall is resiliently movable relative to an opposite side wall and has an edge defining a side edge of the side opening.

The one side wall is movable between first and second positions. In first position wherein it is resiliently biased and wherein its side edge is adjacent the opposite side wall, the side opening is narrower than the diameter of the elongated members so as to retain the elongated members in the channel. In second position wherein the side edge is more remote from the opposite side wall, the side opening is wider than the diameter of the elongated members so as to enable them to be laterally inserted into or withdrawn from the channel through the side opening.

The side walls have projections on the inner surfaces thereof to aid in confining the elongated members in the channel.

Preferably, the channel is sloped relative to the base member.

Preferably, the fastener means comprises flexible projections which extend radially outward from the fastener axis and engage the structure so as to frictionally and releasably secure the fastener in the mounting hole.

A retainer clip in accordance with the present invention offers several advantages over the prior art. For example, the wire receiving channel in the clip enables the wires therein to shift axially in either direction in response to rotary or tilting movement of the movable portion of the steering column, thereby reducing or eliminating bending stresses on the wires. The clip employs a pine tree type of fastener which serves to keep the clip firmly in place, yet simplifies installation and removal of the clip. If the clip is mounted upside down relative to a steering column or other support structure, the wires in the slot are prevented from falling out because the opening to the channel faces upwardly. Furthermore, regardless of the mounting position of the clip, the resiliently biased side wall ensures that the channel opening remains biased toward closure to maintain the wires in the channel. This also facilitates handling of the clip and wires during installation or servicing. Fabrication of the retainer clip as a one-piece part eliminates the need for the person making the initial installation or subsequent repair to search for and manually assemble two separate pieces, thereby saving time and reducing costs. Other objects and advantages of the invention will hereinafter appear.

DRAWINGS

DESCRIPTION OF THE PREFERRED EMBODIMENT

Figure 2:
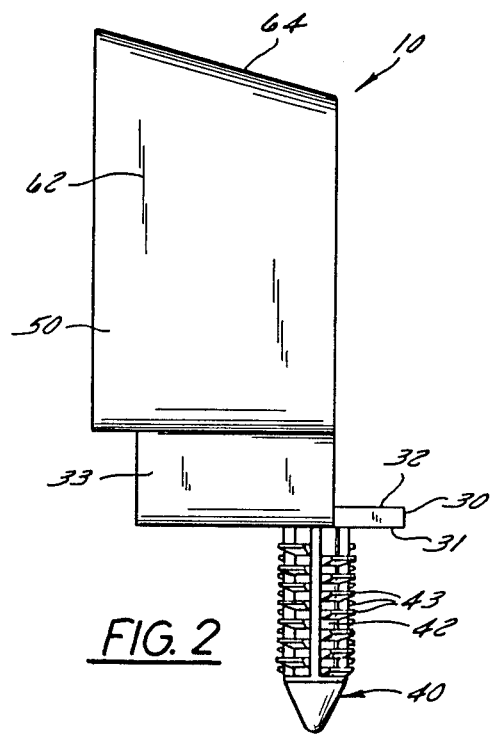
FIG. 2 is an enlarged elevational view of the rear side of the clip.
Figure 1:
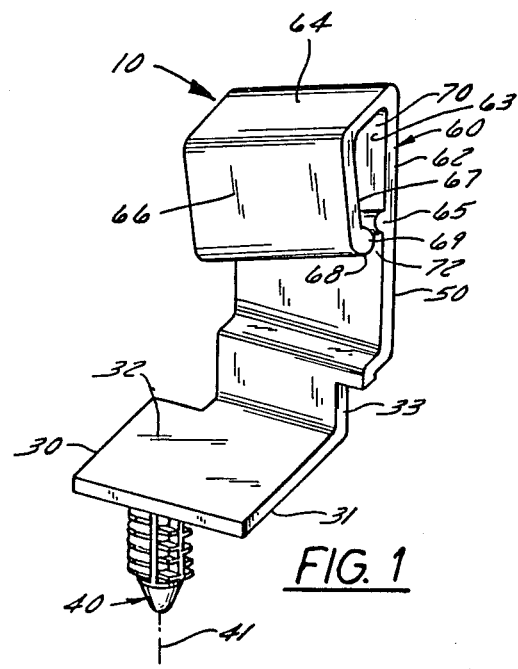
FIG. 1 is a perspective view of a retainer clip in accordance with the present invention.
Figure 3:
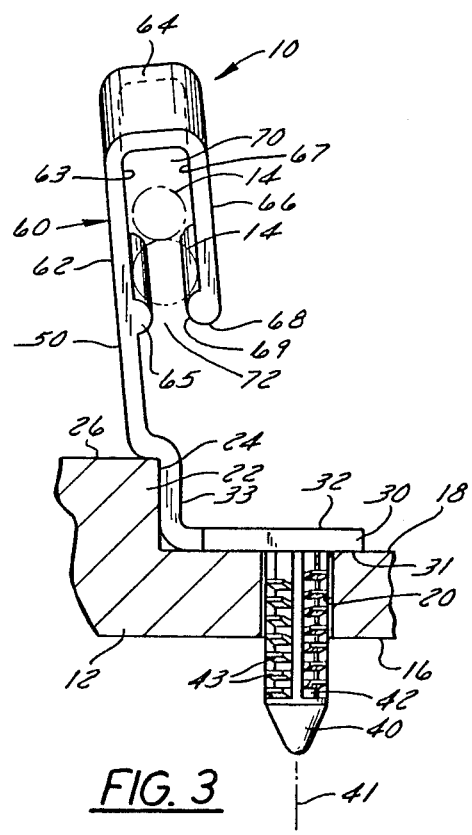
FIG. 3 is an elevational view of the one end of the clip and showing elongated members, such as two electric wires, mounted thereon.
Figure 4:
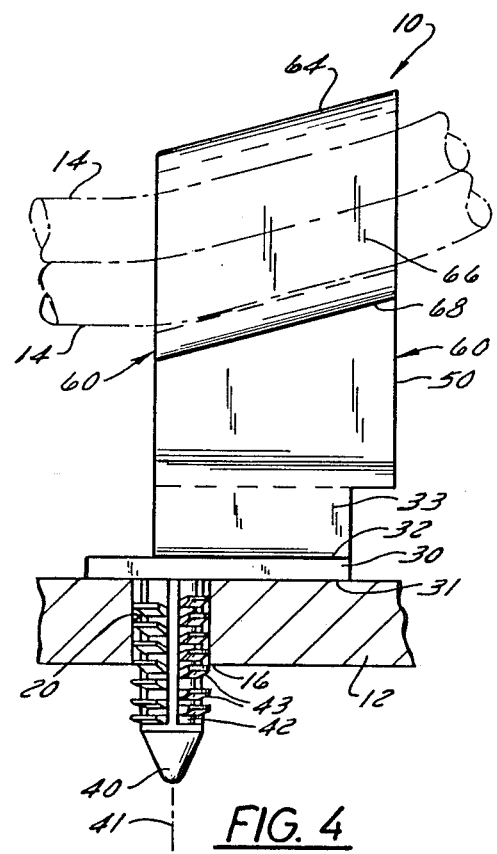
FIG. 4 is an elevational view of the front side of the clip and showing wires, mounted thereon.
Figure 8:
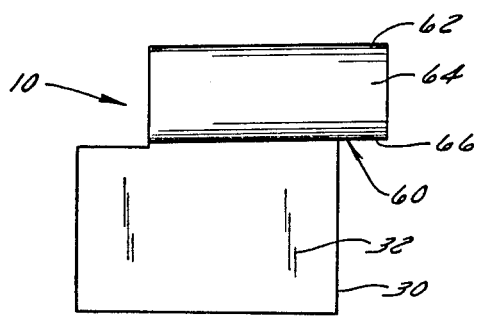
FIG. 8 is a top plan view of the clip.
Figure 6:
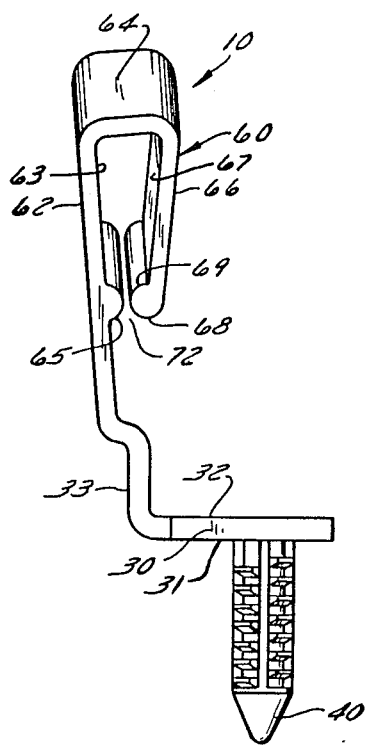
FIG. 6 is an elevational view, similar to FIG. 3, of one end of the clip.
Figure 5:
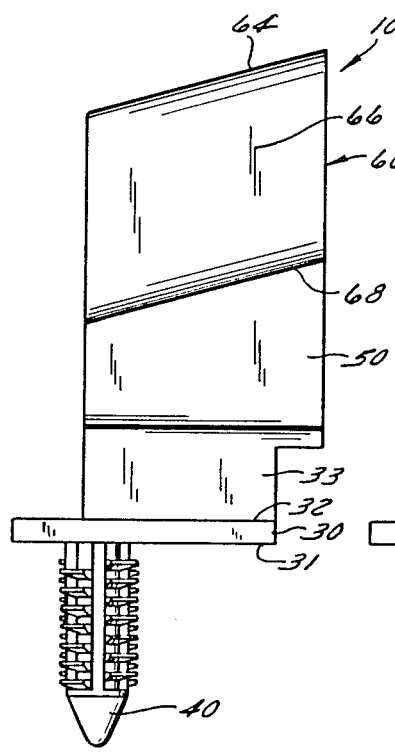
FIG. 5 is an elevational view of the front side of the clip.
Figure 7:
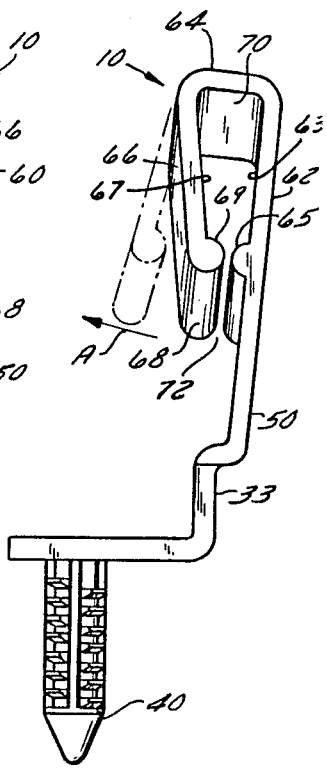
FIG. 7 is an elevational view of the other end of the clip.
Figure 9:
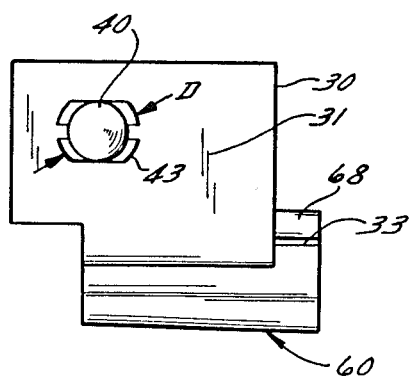
FIG. 9 is a bottom plan view of the clip.

FIGS. 1 through 9 show a retainer clip 10 in accordance with the present invention. FIGS. 3 and 4 show clip 10 mounted on a structure, such as a portion of the steering column 12 of an automobile, and supporting elongated members, such as a pair of insulated flexible electric wires 14.

As FIGS. 3 and 4 show, clip 10 is usable with a structure such as 12 which has a lower surface 16, an upper surface 18, a mounting hole 20 extending through the surfaces 16 and 18, and a shoulder or abutment 22 extending outwardly from upper surface 18 and spaced from mounting hole 20. Abutment 22 has a side face 24 disposed transversely to upper surface 18 and has an upper face 26 disposed transversely to side face 24.

As FIGS. 2 and 3 further show, clip 10 operates to releasably support one or a plurality of flexible wires 14 which, it is to be understood, are periodically movable axially in either direction, laterally to a limited extent, and are subjected to bending movements as steering column 12 is rotated and/or tilted.

Clip 10 is fabricated in one piece of resilient flexible plastic, such as Nylon TM or the like, by a process of injection molding. Clip 10 generally comprises a flat base member 30 having a bottom side 31, an upper side 32 and a side edge 33; a fastener means or portion 40 integral with and extending outwardly from bottom side 31 of base member 30; a projecting portion 50 integral with side edge 33 of base member 30 and extending outwardly from upper side 32 of base member 30; and wire retainer means or portion 60 integral with side edge 33 of base member 30 and extending outwardly from upper side 32 of base member 30; and wire retainer means or portion 60 integral with projecting portion 50.

Fastener means 40 of clip 10 is similar in exterior configuration to the shank of a fastener disclosed in my U.S. Pat. No. 4,396,329 entitled "Pine Tree Clip" issued Aug. 2, 1983 and assigned to the same assignee as the present application. Fastener means 40, which has a longitudinal axis 41, comprises a shank 42 from which a plurality of flexible resilient teeth 43 arranged in rows and which extend radially outwardly relative to axis 41. The diameter D of fastener means 40 (see FIG. 9), measured between the outer edges of the teeth 43, is slightly larger than the diameter of mounting hole 20, as FIG. 4 shows. Thus, when fastener means 40 is fully inserted in mounting hole 20, the teeth 43 within the mounting hole are bent upwardly to accommodate the size of the mounting hole, whereas those teeth on that portion of the fastener means projecting from the bottom of the mounting hole are sprung radially outwardly. Those teeth 43 nearest lower surface 16 of structure 12 engage surface 16 and cooperate with bottom side 31 of base member 30 to maintain clip 10 securely mounted on structure 12. However, since the teeth 43 are flexible, fastener means 40 can be axially withdrawn manually, if sufficient force is used, so as to detach clip 10 from structure 12.

As FIG. 3 shows, the projecting portion 50 of clip 10 is shaped and sized so as to engage and fit against abutment 22 on structure 12. This arrangement serves a two-fold purpose: first, it prevents clip 10 from rotating about axis 41 in response to movement of the wires 14, thereby ensuring that the wires are maintained in proper orientation; and, second, it strengthens and supports clip 10 against bending movements which might cause it to break or shear it off from fastener means 40.

The wire retainer means or portion 60 of clip 10, which is integral with and supported on projecting portion 50, comprises a first side wall 62, an end wall 64, and a second side wall 66. First side wall 62 is joined at its lower end to projecting portion 50 and is joined at its upper end to one edge of end wall 64. Second side wall 66 is joined at its upper end to the other edge of end wall 64 and its free lower end 68 is resiliently movable in the directions of arrow A (FIG. 7) between a nearly closed position (FIG. 6) into which it is normally biased and a more open position (FIG. 7) wherein it can accommodate lateral wire insertion and removal.

The side walls 62 and 66 are provided on their inner surfaces 63 and 67, respectively, with integrally formed ridges 65 and 69, respectively, on which a wire 14 can lie.

The walls 62, 64 and 66 cooperate to define a wire-receiving channel 70 which is open at opposite ends and has an opening 72 along one side. The width of opening 72 is defined by the distance between ridge 69 at the free lower end 68 of second side wall 66 and ridge 65 on first side wall 62. The width of opening 72 can vary from the biased, nearly closed position shown in FIG. 6, to the more open position shown in FIG. 7 to accommodate wire insertion or removal, or to the wire-retaining position shown in FIG. 3 wherein wires 14 are disposed in channel 70 and the lowermost wire is of greater diameter than the width between the ridges 65 and 69.

In the embodiment disclosed herein the walls 62, 64, 66 and the ridges 65 and 69 are configured and located so that channel 70 is sloped or disposed at an angle with respect to the plane in which base member 30 of clip 10 lies. The advantage of this, as FIG. 4 shows, is to accommodate the curvature of the wires 14 which change direction at the location of clip 10 on structure 12.

Clip 10 is employed as follows. In one mode of installation, clip 10 is first mounted on structure 12 by insertion of its fastener means 40 into mounting hole 20 and then the wires (already located nearby, for example) are laterally inserted, one at a time, through opening 72 into channel 70. In another mode of installation, the wires 14 are first inserted into channel 70 through opening 72 and then clip 10 is slid along the wires to a location whereat fastener means 40 can be inserted into mounting hole 20.

Clip 10 can be installed in any position and will securely retain the wires 14 therein. In some cases clip 10 is installed on the underside of a steering column and the opening 72 of channel 70 faces upwardly and there is no possibility that the wires 14 can fall out through opening 72. However, even if clip 10 is installed so that opening 72 faces downwardly (as shown in FIGS. 1 through 9), the design of the clip is such that the wire 14 in channel 70 cannot fall out due to gravity because the ridges 65 and 69 and the bias of second side wall 66 prevent this.

It is to be understood that, while clip 10 is especially well-adapted to support movable electric wires or the like, it could be employed to support a rigid, non-movable solid or tubular elongated member, such as a rod or a fluid line, for example.

I claim:

1. A retainer clip for supporting an elongated member on a structure, said structure having a surface with a mounting hole therein and an abutment extending from said surface and spaced from said mounting hole, said retainer clip comprising:

a base member having opposite base surfaces;

fastener means extending along an axis from one of said base surfaces for axial insertion into said mounting hole to releasably mount said retainer clip on said structure, said fastener means being relatively rotatable in said mounting hole about said axis;

means on said base member engageable with said abutment when said fastener means is inserted into said mounting hole to prevent rotation of said retainer clip around said axis of said fastener means;

and retainer means supported on said means on said base member and defining a channel for receiving and slidably supporting said elongated member, said channel being open at both ends and having a side opening through which said elongated member is insertable laterally into said channel, said side opening confronting and spaced from the other of said base surfaces, said channel being sloped relative to the axis of said fastener means, said retainer means comprising walls defining said channel, at least one of said walls being a side wall resiliently movable relative to an opposite side wall and having an edge defining a side edge of said side opening, said one side wall being movable between a first position wherein it is resiliently biased and wherein said side edge is adjacent said opposite side wall and said side opening is narrower than the diameter of said elongated member so as to retain said elongated member in said channel, and a second position wherein said side edge is more remote from said opposite side wall and said side opening is wider than said diameter of said elongated member so as to enable said elongated member to be laterally inserted into or withdrawn from said channel through said side opening.

2. A retainer clip according to claim 1 wherein at least one of the side walls has a projection on the inner surface thereof to aid in confining said elongated member in said channel.

3. A retainer clip according to claim 1 or 2 wherein said fastener means comprises flexible projections which extend radially outward from said axis and engage said structure so as to frictionally and releasably secure said fastener in said mounting hole, said projections being flexible in opposite directions relative to said axis.

4. A retainer clip for supporting an elongated member on a structure, said structure having a surface with a mounting hole therein and an abutment extending outwardly from said surface for a first predetermined distance and spaced laterally from said mounting hole for a second predetermined distance, said clip comprising:

a base member having opposite base surfaces and a base edge;

a fastener member integrally formed with and projecting axially outwardly along an axis from one of said base surfaces for axial insertion into said mounting hole wherein it is frictionally but releasably maintained, said fastener member being relatively rotatable in said mounting hole about said axis;

a side member integrally formed with and located at said base edge and projecting outwardly from the other of said base surfaces, said side member being engageable with said abutment so as to prevent rotation of said clip around said axis of said fastener member;

and retainer means supported on said side member and comprising:

a first side wall integrally formed with said side member and projecting outwardly relative to said other base surface;

an end wall integrally formed with said first side wall;

a second side wall integrally formed with said end wall and projecting inwardly toward said other base surface, said second side wall having a free end resiliently movable relative to said first side wall;

said first side wall, said end wall and said second side wall cooperating to define a channel open at its opposite ends and having an opening along a side of said channel near, spaced from and confronting said other base surface of said base member to enable said elongated member to be inserted laterally through said opening into said channel;

said second side wall being resiliently movable away from said first side wall to enlarge the width of said opening to enable said opening to accommodate passage of said elongated member therethrough and being resiliently movable and biased toward said first side wall to diminish the width of said opening to confine said elongated member in said channel but to enable said elongated member to move axially in said channel, said channel being sloped relative to the plane in which said base member lies; and a projection on the inner surface of at least one of the side walls to aid in confining said elongated member in said channel.

5. A retainer clip according to claim 4 wherein said fastener member comprises flexible projections which extend radially outward from said axis and engage said structure so as to fictionally and releasably secure said fastener member in said mounting hole, said projections being flexible in opposite directions relative to said axis.

* * * * *